(12) United States Patent
Lu

(10) Patent No.: US 8,238,601 B2
(45) Date of Patent: Aug. 7, 2012

(54) SYSTEM AND METHOD FOR REMOVING DIGITAL WATERMARKS FROM A WATERMARKED IMAGE

(75) Inventor: Yi-Chun Lu, Tu-Cheng (TW)

(73) Assignee: Chi Mei Communication Systems, Inc., Tu-Cheng, New Taipei (TW)

(*) Notice: Subject to any disclaimer, the term of this patent is extended or adjusted under 35 U.S.C. 154(b) by 616 days.

(21) Appl. No.: 12/465,654

(22) Filed: May 14, 2009

(65) Prior Publication Data

US 2010/0074467 A1 Mar. 25, 2010

(30) Foreign Application Priority Data

Sep. 19, 2008 (CN) .......................... 2008 1 0304564

(51) Int. Cl.
*G06K 9/00* (2006.01)
(52) U.S. Cl. ........................................................ 382/100
(58) Field of Classification Search .................... 382/100
See application file for complete search history.

(56) References Cited

U.S. PATENT DOCUMENTS 7,137,005 B2* 11/2006 Sall et al. ........................ 713/176
2007/0237354 A1* 10/2007 Zhou ................................ 382/100

OTHER PUBLICATIONS

Hsu et al "A New Watermark Attacking Method Based on Eigen-Image Energy", Te-Cheng Hsu ; Wen-Shyong Hsieh ; Tung-Shih Su ; Intelligent Information Hiding and Multimedia Signal Processing, 2008. IIHMSP '08 International Conference on Issue Date: Aug. 15-17, 2008 on pp. 29-32 Print ISBN: 978-0-7695-3278-3.*
Chou et al, "A perceptually tuned subband image coder based on the measure of just-noticeable-distortion profile" Circuits and Systems for Video Technology, IEEE Transactions on Issue Date: Dec. 1995 vol. 5 Issue:6 on pp. 467-476 ISSN: 1051-8215.*
Ma et al, "Digital watermarking of spectral images using SVD in PCA-transform domain", Communications and Information Technology, 2005. ISCIT 2005. IEEE International Symposium on Issue Date : Oct. 12-14, 2005 vol. 2 On pp. 1489-1492 Print ISBN: 0-7803-9538-7.*
Majumder et al, "DWT and SVD based image watermarking scheme using noise visibility and contrast sensitivity", Recent Trends in Information Technology (ICRTIT), 2011 International Conference on Issue Date : Jun. 3-5, 2011 On pp. 938-942 Print ISBN: 978-1-4577-0588-5.*

* cited by examiner

*Primary Examiner* — Tom Y Lu
(74) *Attorney, Agent, or Firm* — Altis Law Group, Inc.

(57) ABSTRACT

A system and method for removing digital watermarks from a watermarked image of an electronic device are provided. The method decomposes the watermarked image to a plurality of Eigen-images, assigns an identifier to each of the Eigen-images in sequence, and identifies an identifier range of the Eigen-images to be removed from the watermarked image. The method further selects Eigen-images having watermarked information from the identifier range, deletes the Eigen-images having watermarked information from the Eigen-images within the identifier range, and integrates the remainder Eigen-images of the identifier range to form a composite image. Additionally, the method determines whether the composite image is distorted, and stores the composite image into a storage device of the electronic device if the composite image is not distorted.

16 Claims, 4 Drawing Sheets

SYSTEM AND METHOD FOR REMOVING DIGITAL WATERMARKS FROM A WATERMARKED IMAGE

BACKGROUND

1. Technical Field

Embodiments of the present disclosure relate to systems and methods for processing digital images, and more particularly to a system and method for removing digital watermarks from a watermarked image.

2. Description of Related Art

The rapid development of Internet introduces a new set of challenging problem regarding security of digital information. To prevent unauthorized copying of digital information from distributing is one of the significant problems. Digital watermarks is a potential method for protecting the ownership rights on digital audio, image and video data. A watermarking attack succeeds in defeating a watermarked image if the watermarking attack impairs the watermarked information beyond acceptable limits while maintaining the perceptual quality of the attacked image. Namely, attacks on digital watermarked image must consider both watermarking information survival and the distortion of the attacked image. However, current watermarking attacks do not exploit as much knowledge of the watermarked image as possible, and do not consider the distortion of the attacked image.

Therefore, there is a improved system and method for removing digital watermarks from a watermarked image, which can overcome the above-mentioned problems.

DETAILED DESCRIPTION

Figure 1:
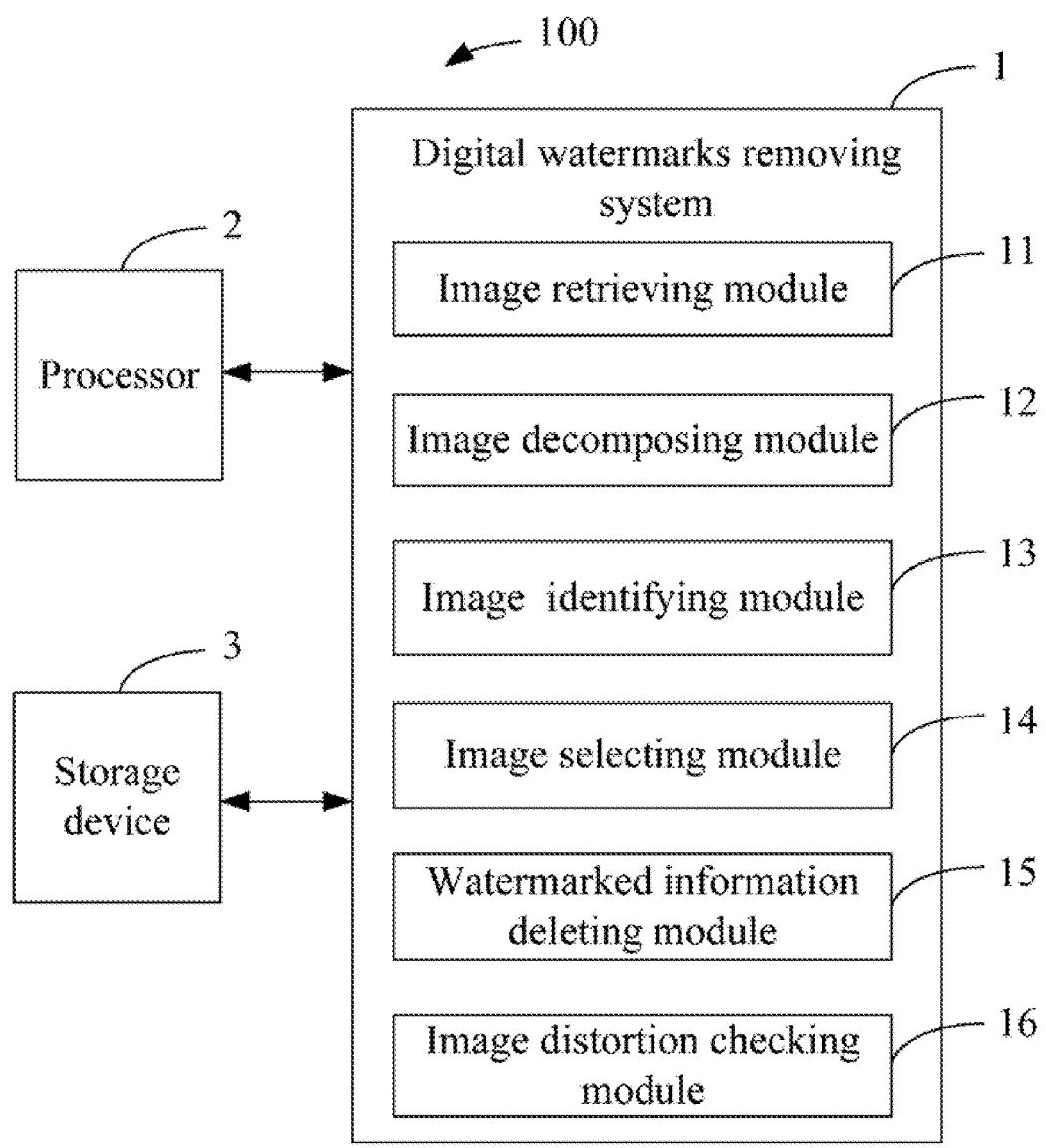
FIG. 1 is a schematic diagram of one embodiment of a system for removing watermarked watermarks from a digital image.

FIG. 1 is a schematic diagram of one embodiment of a system 1 for removing digital watermarks from a watermarked image (hereinafter "digital watermarks removing system 1"). The digital watermarks removing system 1 is implemented by an electronic device 100, which includes at least one processor 2 and a storage device 3. The electronic device 100 may be a computer, a mobile phone, a personal digital assistant (PDA) device, and any other image processing device having image processing functions. The at least one processor 2 executes the digital watermarks removing system 1 to remove watermarked information from a digital image having digital watermarks. The storage device 3 stores a plurality of watermarked images, and a composite image whose watermarked information have been removed. In one embodiment, the digital watermarks removing system 1 is included in storage device 3 or other readable medium of the electronic device 100. In another embodiment, the digital watermarks removing system 1 may be included in an operating system of the electronic device 100.

In one embodiment, the digital watermarks removing system 1 may include an image retrieving module 11, an image decomposing module 12, an image identifying module 13, an image selecting module 14, a watermarked information deleting module 15, and an image distortion checking module 16. Each of the function modules 11-16 can be executed by the at least one processor 2 of the electronic device 100.

The image retrieving module 11 is operable to retrieve a watermarked image from the storage device 3 of the electronic device 100. The watermarked image may include a plurality of watermarked information, such as ownership rights on the watermarked image, or/and unauthorized information of the watermarked image.

The image decomposing module 12 is operable to decompose the watermarked image to a plurality of Eigen-images by using a singular value decomposition (SVD) algorithm, and uniquely assigning an identifier to each of the Eigen-images in sequence. The SVD algorithm is used to extract the watermarked information from the watermarked image by calculating the maximum singular value of pixel points of the watermarked image. In one embodiment, the image decomposing module 12 can decompose the watermarked image to $2^n$ Eigen-images, such as 8 Eigen-images, 64 Eigen-images, or 128 Eigen-images etc. For example, if the watermarked image has 128×128 pixels, the image decomposing module 12 decomposes the watermarked image to 128 Eigen-images, and assigns each of the 128 Eigen-images as a unique identifier 1 2, 3, . . . , 128 respectively.

The image identifying module 13 is operable to identify an identifier range of the Eigen-images to be removed from the watermarked image by using a just noticeable distortion (JND) algorithm. The JND algorithm is used to determine whether the watermarked information is included in an Eigen-image by calculating each eigen value of each Eigen-point in the Eigen-image.

The image selecting module 14 is operable to calculate an eigen value of each Eigen-point in the Eigen-image, add all the eigen values to obtain a total eigen value of the Eigen-image, and select the Eigen-images having watermarked information from the identifier range according to the total eigen values. In one embodiment, the Eigen-image has watermarked information if the total eigen value of the Eigen-image is greater than a predefined value (e.g., the predefined value can be predefined as 128 according to the pixel value of the watermarked image). Otherwise, the Eigen-image has no watermarked information if the eigen value of the Eigen-image is not greater than the predefined value.

The watermarked information deleting module 15 is operable to delete the selected Eigen-images having watermarked information from the Eigen-images within the identifier range, and integrate the remainder Eigen-images of the identifier range to obtain a composite image.

The image distortion checking module 16 is operable to calculate a peak signal to noise ratio (PSNR) value of the composite image, and determine whether the composite image is distorted by checking if the PSNR value is greater than an allowable value (e.g., the allowable value can be set as "0.8"). In one embodiment, the PSNR value is obtained by calculating a ratio of the pixel value of the composite image and a pixel value of the watermarked image. The image distortion checking module 16 determines that the composite image is not distorted if the PSNR value of the composite image is greater than the allowable value. Otherwise, if the PSNR value of the composite image is not greater than the allowable value, the image distortion checking module 16 determines that the composite image is distorted. The image distortion checking module 16 is further operable to store the composite image to the storage device 3 if the composite image is not distorted.

Figure 2:
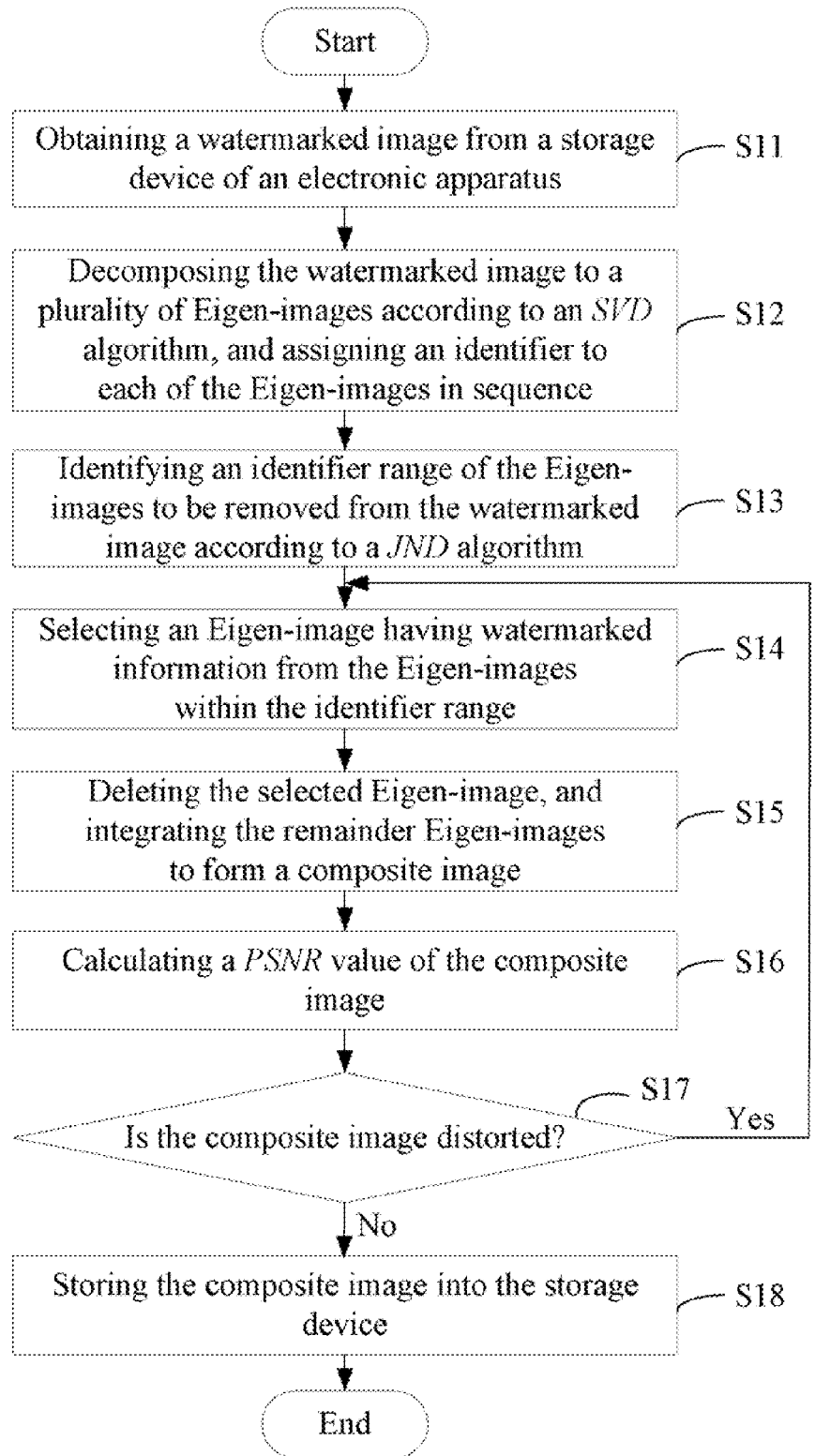
FIG. 2 is a flowchart of one embodiment of a method for removing digital watermarks from a watermarked image by the system of FIG. 1.

FIG. 2 is a flowchart of one embodiment of a method for removing digital watermarks from a watermarked image by using the digital watermarks removing system 1 of FIG. 1 as described above. Depending on the embodiment, additional blocks may be added, others removed, and the ordering of the blocks may be changed.

In block S11, the image retrieving module 11 obtains the watermarked image from the storage device 3 of the electronic device 100. The watermarked image typically includes a plurality of watermarked information, such as ownership rights information and unauthorized copying information.

In block S12, the image decomposing module 12 decomposes the watermarked image to a plurality of Eigen-images by using a SVD algorithm, and uniquely assigns an identifier to each of the Eigen-images in sequence. The SVD algorithm is used to extract the watermarked information from the watermarked image by calculating the maximum singular value of pixel points of the watermarked image. In one embodiment, the image decomposing module 12 can decompose the watermarked image to $2^n$ Eigen-images, such as 8 Eigen-images, 64 Eigen-images, or 128 Eigen-images etc. For example, if the watermarked image has 128*128 pixels, the image decomposing module 12 decomposes the watermarked image to 128 Eigen-images, and assigns each of the 128 Eigen-images as a unique identifier 1 2, 3, . . . , 128 respectively.

Figure 3:
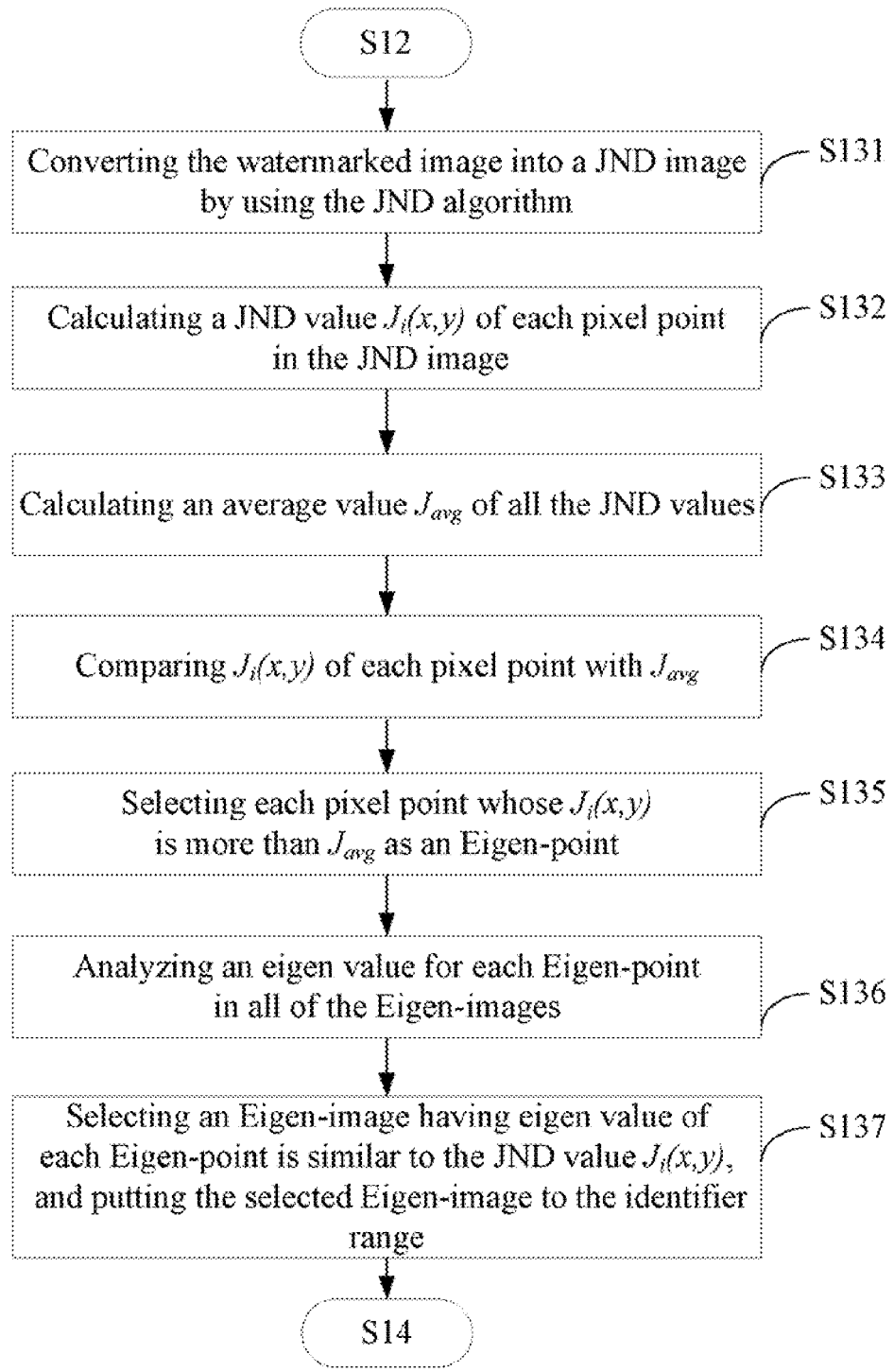
FIG. 3 is a flowchart of detailed descriptions of S13 in FIG. 2.

In block S13, the image identifying module 13 identifies an identifier range of the Eigen-images that need to be removed from the watermarked image by using a JND algorithm. The JND algorithm is used to determine whether the watermarked information is included in an Eigen-image by calculating each eigen value of each Eigen-point in the Eigen-image. Referring to FIG. 3 shows that the identifier range of the Eigen-images is identified by using the JND algorithm.

Figure 4:
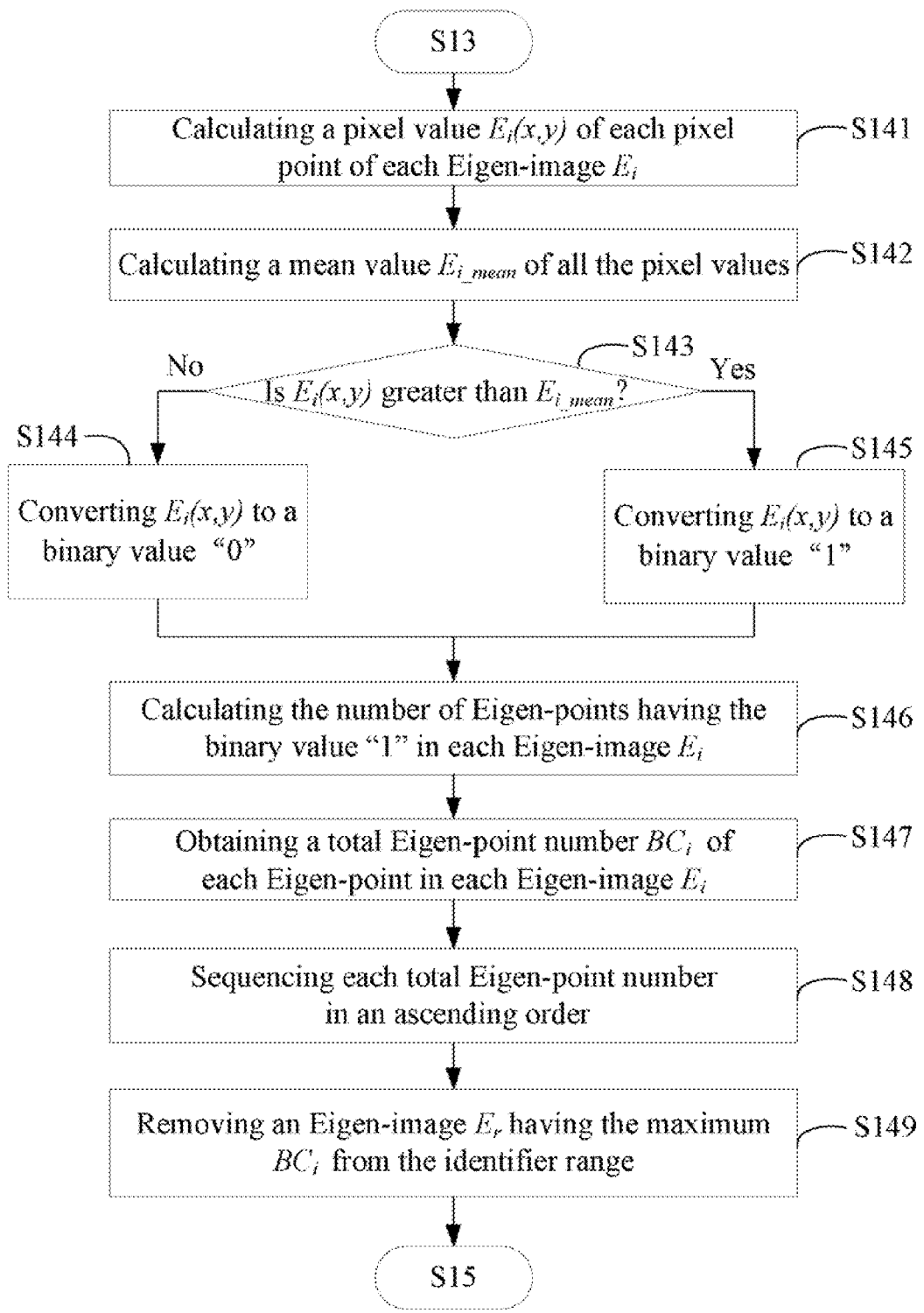
FIG. 4 is a flowchart of detailed descriptions of S14 in FIG. 2.

In block S14, the image selecting module 14 selects an Eigen-image having watermarked information from the identifier range by using the JND algorithm. Referring to FIG. 4 shows that the Eigen-image having the watermarked information is selected from the identifier range by using the JND algorithm.

In block S15, the watermarked information deleting module 15 deletes the Eigen-image having watermarked information from the Eigen-images within the identifier range, and integrates the remainder Eigen-images of the identifier range to form a composite image.

In block S16, the image distortion checking module 16 calculates a PSNR value of the composite image. The PSNR value is obtained by calculating the ratio of the pixel value of the composite image and the pixel value of the watermarked image.

In block S17, the image distortion checking module 16 determines whether the composite image is distorted by checking if the PSNR value is greater than an allowable value (e.g., the allowable value can be set as 0.8). In one embodiment, the image distortion checking module 16 determines that the composite image is not distorted if the PSNR value of the composite image is greater than the allowable value. Otherwise, if the PSNR value of the composite image is not greater than the allowable value, the image distortion checking module 16 determines that the composite image is distorted.

If the composite image is distortion, the procedure returns to block S14, in order to select another Eigen-image having watermarked information from the identifier range. Otherwise, if the composite image is not distorted, in block S18, the image distortion checking module 16 stores the composite image to the storage device 3 of the electronic device 100.

FIG. 3 is a flowchart of detailed descriptions of S13 in FIG. 2. In block S131, the image identifying module 13 converts the watermarked image into a JND image by using the JND algorithm. In block S132, the image identifying module 13 calculates a JND value of each pixel point in the JND image, wherein the JND value is denoted as "$J_i(x,y)$". In block S133, the image identifying module 13 calculates an average value of all the JND values, wherein the average value is denoted as "$J_{avg}$".

In block S134, the image identifying module 13 compares the JND value $J_i(x,y)$ of each pixel point with the average value $J_{avg}$ respectively. In block S135, the image identifying module 13 selects each pixel point in the JND image whose JND value $J_i(x,y)$ is greater than the average value $J_{avg}$ as an Eigen-point of the Eigen-image.

In block S136, the image identifying module 13 analyzes an eigen value for each of the Eigen-points in all of the Eigen-images. In block S137, the image identifying module 13 selects an Eigen-image having eigen value of each Eigen-point is similar to the JND value $J_i(x,y)$, and sets the selected Eigen-images to the number range.

FIG. 4 is a flowchart of detailed descriptions of S14 in FIG. 2. In block S141, the image selecting module 14 calculates a pixel value of each pixel point of each Eigen-image in the identifier range, wherein each of the Eigen-images is denoted as "$E_i$", and each of the pixel values is denoted as "$E_i(x,y)$". In block S142, the image selecting module 14 calculates a mean value of all the pixel values, wherein the mean value is denoted as "$E_{i\_mean}$".

In block S143, the image selecting module 14 determines whether each pixel value $E_i(x,y)$ is greater than the mean value $E_{i\_mean}$. If each pixel value $E_i(x,y)$ is not greater than the mean value $E_{i\_mean}$, in block S144, the image selecting module 14 converts each pixel value $E_i(x,y)$ to a binary value "0". Otherwise, if each pixel value $E_i(x,y)$ is greater than the mean value $E_{i\_mean}$, in block S145, the image selecting module 14 converts each pixel value $E_i(x,y)$ to a binary value "1".

In block S146, the image selecting module 14 selects the pixel points having the binary value "1" as Eigen-points of each Eigen-image $E_i$. In block S147, the image selecting module 14 calculates a total Eigen-point number of each Eigen-image $E_i$ by adding the number of the selected Eigen-points of each Eigen-image $E_i$, wherein each of the total Eigen-point numbers is denoted as "$BC_i$".

In block S148, the image selecting module 14 sequences each Eigen-point number $BC_i$ in an ascending order. In block S149, the image selecting module 14 selects an Eigen-image $E_i$ having the maximum Eigen-point number $BC_i$ from all the Eigen-image $E_i$ within the identifier range. In one embodiment, the Eigen-image has greater watermarked information than other Eigen-images if the Eigen-image has a maximum Eigen-point number.

All of the processes described above may be embodied in, and fully automated via, functional code modules executed by one or greater general purpose processors or electronic devices. The functional code modules may be stored in any type of readable medium or other storage devices. Some or all of the methods may alternatively be embodied in specialized the electronic devices.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing system for removing digital watermarks from a watermarked image, the computing system comprising:
   a storage device operable to store a plurality of watermarked images; and
   a least one processor operable to execute a digital watermarks removing system, comprising:
   an image retrieving module operable to retrieve a watermarked image from the storage device;
   an image decomposing module operable to decompose the watermarked image to a plurality of Eigen-images, and assign an identifier to each of the Eigen-images in sequence;
   an image identifying module operable to identify an identifier range of the Eigen-images to be removed from the watermarked image, wherein the image identifying module is further operable to:
   convert the watermarked image into a just noticeable distortion (JND) image by using a JND algorithm;
   calculate a JND value of each pixel point in the JND image, and calculating an average value of all the JND values;
   compare the JND value of each pixel point with the average value;
   select each pixel point of the JND image whose JND value is greater than the average value as an Eigen-point of the Eigen-image;
   analyze an eigen value for each of the Eigen-points in all the Eigen-images; and
   select each Eigen-image whose eigen value of each Eigen-point is similar to the JND value, and putting the identifier of the selected Eigen-images to the identifier range;
   an image selecting module operable to calculate an eigen value of each Eigen-point in each Eigen-image, obtain a total eigen value of each Eigen-image by adding the eigen values of all the Eigen-points in each Eigen-image, and select Eigen-images having watermarked information from the Eigen-images within the identifier range according to the total eigen values; and
   a watermarked information deleting module operable to delete the selected Eigen-images from the Eigen-images within the identifier range, integrate the remainder Eigen-images of the identifier range to obtain a composite image, and store the composite image in the storage device.

2. The computing system according to claim 1, wherein the digital watermarks removing system further comprises an image distortion checking module operable to calculate a peak signal to noise ratio (PSNR) value of the composite image, and determine whether the composite image is distorted according to the PSNR value.

3. The computing system according to claim 2, wherein the PSNR value is obtained by calculating a ratio of a pixel value of the composite image and a pixel value of the watermarked image.

4. The computing system according to claim 1, wherein the image decomposing module decomposes the watermarked image to the Eigen-images by using a singular value decomposition algorithm, which is used to extract the watermarked information from the watermarked image.

5. The computing system according to claim 1, wherein the image identifying module identifies the number range of the Eigen-images by using the JND algorithm, which is used to determine whether the watermarked information is included in an Eigen-image.

6. The computing system according to claim 1, wherein the watermarked information comprise ownership rights on the watermarked image and unauthorized information of the watermarked image.

7. A method for removing digital watermarks from a watermarked image of an electronic device, the method comprising:
   (a) retrieving the watermarked image from a storage device of the electronic device;
   (b) decomposing the watermarked image to a plurality of Eigen-images, and assigning an identifier to each of the Eigen-images in sequence;
   (c) identifying an identifier range of the Eigen-images to be removed from the watermarked image, wherein the block (c) comprises:
   converting the watermarked image into a just noticeable distortion (JND) image by using a JND algorithm;
   calculating a JND value of each pixel point in the JND image, and calculating an average value of all the JND values;
   comparing the JND value of each pixel point with the average value;
   selecting each pixel point of the JND image whose JND value is greater than the average value as an Eigen-point of the Eigen-image;
   analyzing an eigen value for each of the Eigen-points in all the Eigen-images; and
   selecting each Eigen-image whose eigen value of each Eigen-point is similar to the JND value, and putting the identifier of the selected Eigen-images to the identifier range;
   (d) selecting an Eigen-image having watermarked information from the Eigen-images within the identifier range;
   (e) deleting the selected Eigen-image having watermarked information;
   (f) integrating the remainder Eigen-images within the identifier range to form a composite image;
   (g) determining whether the composite image is distorted; and
   (h) returning to block (d) if the composite image is distorted, or storing the composite image into the storage device if the composite image is not distorted.

8. The method according to claim 7, wherein block (d) comprises:
   calculating a pixel value of each pixel point in each Eigen-image;
   calculating a mean value of all the pixel values;
   determining whether each pixel value is greater than the mean value;
   converting each pixel value to a binary value "0" if the pixel value is no greater than the mean value, or converting each pixel value to a binary value "1" if the pixel value is greater than the mean value;
   selecting the pixel points having the binary value "1" as Eigen-points of each Eigen-image;
   calculating a total Eigen-point number of each Eigen-image;
   sequencing each total Eigen-point number in an ascending order; and
   selecting an Eigen-image having the maximum total Eigen-point number.

9. The method according to claim 8, further comprising:
   determining that the Eigen-image has the watermarked information if the total Eigen-point number of the Eigen-image is greater than a predefined value, wherein the predefined value is predefined according to the pixel value of the watermarked image; and determining that the Eigen-image has no watermarked information if the total Eigen-point number of the Eigen-image is not greater than the predefined value.

10. The method according to claim 7, wherein block (g) comprises:
calculating a peak signal to noise ratio (PSNR) value of the composite image;
checking whether the PSNR value is greater than an allowable value;
determining that the composite image is not distorted, if the PSNR value of the composite image is greater than the allowable value; and
determining that the composite image is distorted, if the PSNR value of the composite image is not greater than the allowable value.

11. The method according to claim 10, wherein the PSNR value is obtained by calculating a ratio of a pixel value of the composite image and a pixel value of the watermarked image.

12. A non-transitory computer readable medium having stored thereon instructions that, when executed by an electronic device, cause the electronic device to perform a method for removing digital watermarks from a watermarked image, the method comprising:
(a) obtaining the watermarked image from a storage device of the electronic device;
(b) decomposing the watermarked image to a plurality of Eigen-images, and assigning an identifier to each of the Eigen-images in sequence;
(c) identifying an identifier range of the Eigen-images to be removed from the watermarked image, wherein the block (c) comprises:
converting the watermarked image into a just noticeable distortion (JND) image by using a JND algorithm;
calculating a JND value of each pixel point in the JND image, and calculating an average value of all the JND values;
comparing the JND value of each pixel point with the average value;
selecting each pixel point of the JND image whose JND value is greater than the average value as an Eigen-point of the Eigen-image;
analyzing an eigen value for each of the Eigen-points in all the Eigen-images; and
selecting each Eigen-image whose eigen value of each Eigen-point is similar to the JND value, and putting the identifier of the selected Eigen-images to the identifier range;
(d) selecting an Eigen-image having watermarked information from the Eigen-images within the identifier range;
(e) deleting the selected Eigen-image having watermarked information;
(f) integrating the remainder Eigen-images within the identifier range to form a composite image;
(g) determining whether the composite image is distorted; and
(h) returning to block (d) if the composite image is distorted, or storing the composite image into the storage device if the composite image is not distorted.

13. The medium according to claim 12, wherein block (d) comprises:
calculating a pixel value of each pixel point in each Eigen-image;
calculating a mean value of all the pixel values;
determining whether each pixel value is greater than the mean value;
converting each pixel value to a binary value "0" if the pixel value is no greater than the mean value, or converting each pixel value to a binary value "1" if the pixel value is greater than the mean value;
selecting the pixel points having the binary value "1" as Eigen-points of each Eigen-image;
calculating a total Eigen-point number of each Eigen-image;
sequencing each total Eigen-point number in an ascending order; and
selecting an Eigen-image having the maximum total Eigen-point number.

14. The medium according to claim 13, wherein the method further comprises:
determining that the Eigen-image has the watermarked information if the total Eigen-point number of the Eigen-image is greater than a predefined value, wherein the predefined value is predefined according to the pixel value of the watermarked image; and
determining that the Eigen-image has no watermarked information if the total Eigen-point number of the Eigen-image is not greater than the predefined value.

15. The medium according to claim 12, wherein block (g) comprises:
calculating a peak signal to noise ratio (PSNR) value of the composite image;
checking whether the PSNR value is greater than an allowable value;
determining that the composite image is not distorted, if the PSNR value of the composite image is greater than the allowable value; and
determining that the composite image is distorted, if the PSNR value of the composite image is not greater than the allowable value.

16. The medium according to claim 15, wherein the PSNR value is obtained by calculating a ratio of a pixel value of the composite image and a pixel value of the watermarked image.

* * * * *